United States Patent
Dua et al.

(10) Patent No.: US 11,444,445 B2
(45) Date of Patent: Sep. 13, 2022

(54) DRIVER ASSISTED ESD PROTECTION APPARATUS AND METHOD

(71) Applicant: Intel Corporation, Santa Clara, CA (US)

(72) Inventors: Raj Singh Dua, Bangalore (IN); Sanjay Joshi, Bangalore (IN); Harry Muljono, San Ramon, CA (US); Balkaran Gill, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/125,824

(22) Filed: Dec. 17, 2020

(65) Prior Publication Data

US 2021/0391703 A1 Dec. 16, 2021

(30) Foreign Application Priority Data

Jun. 11, 2020 (IN) .............................. 202041024525

(51) Int. Cl.
*H02H 3/22* (2006.01)
*H02H 3/08* (2006.01)

(52) U.S. Cl.
CPC ..................... *H02H 3/08* (2013.01)

(58) Field of Classification Search
CPC ...................................................... H02H 3/08
USPC ............................................................ 361/111
See application file for complete search history.

(56) References Cited

U.S. PATENT DOCUMENTS

| | | | | |
|---|---|---|---|---|
| 5,592,104 A | * | 1/1997 | Bach | H03K 19/09429 326/27 |
| 6,437,611 B1 | * | 8/2002 | Hsiao | H03K 17/166 327/108 |
| 6,545,520 B2 | * | 4/2003 | Maloney | H01L 27/0285 327/318 |
| 9,030,791 B2 | * | 5/2015 | Prabhu | H02H 9/046 361/118 |
| 9,716,381 B2 | * | 7/2017 | Chen | H02H 9/046 |
| 2007/0091524 A1 | * | 4/2007 | Davis | H01L 27/0285 361/56 |
| 2017/0271322 A1 | * | 9/2017 | Russ | H01L 27/0285 |

* cited by examiner

*Primary Examiner* — Jared Fureman
*Assistant Examiner* — Lucy M Thomas
(74) *Attorney, Agent, or Firm* — Williamson & Wyatt, P.C.

(57) ABSTRACT

Analog Front End (AFE) driver or transmitter is used for ESD protection of an input-output (IO) pin, thus reducing ESD diode count and subsequently lowering the pad capacitance to achieve high performance in IO circuits like double data rate (DDR) IO, PCI Express (Peripheral Component Interconnect Express), etc. The channel of active devices that constitute AFE driver are used to connect an IO pad to discharge the ESD current to ground, thus providing an alternative path to ESD current and subsequently reducing the ESD diode count. An additional p-type device (Driver Path Enabler (DPE)) is coupled between the IO pad and a gate terminal of the AFE driver. This additional p-type device triggers the channel of the AFE driver. This p-type device is controlled by an RC based structure which cuts the p-type device off during regular operations when power is ramped-up.

17 Claims, 4 Drawing Sheets

DRIVER ASSISTED ESD PROTECTION APPARATUS AND METHOD

CLAIM FOR PRIORITY

This application claims the benefit of priority to Indian Patent Application No. 202041024525, filed on Jun. 11, 2020, titled "DRIVER ASSISTED ESD PROTECTION APPARATUS AND METHOD," and which is incorporated by reference in entirety.

BACKGROUND

Parasitic diodes from a driver, which are used for Electro Static Discharge (ESD) protection may no longer be effective in advanced process technology nodes. ESD diodes add lot of cost to an IO in terms of area, power and pad-capacitance and have become a greater challenge for higher speed nodes.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
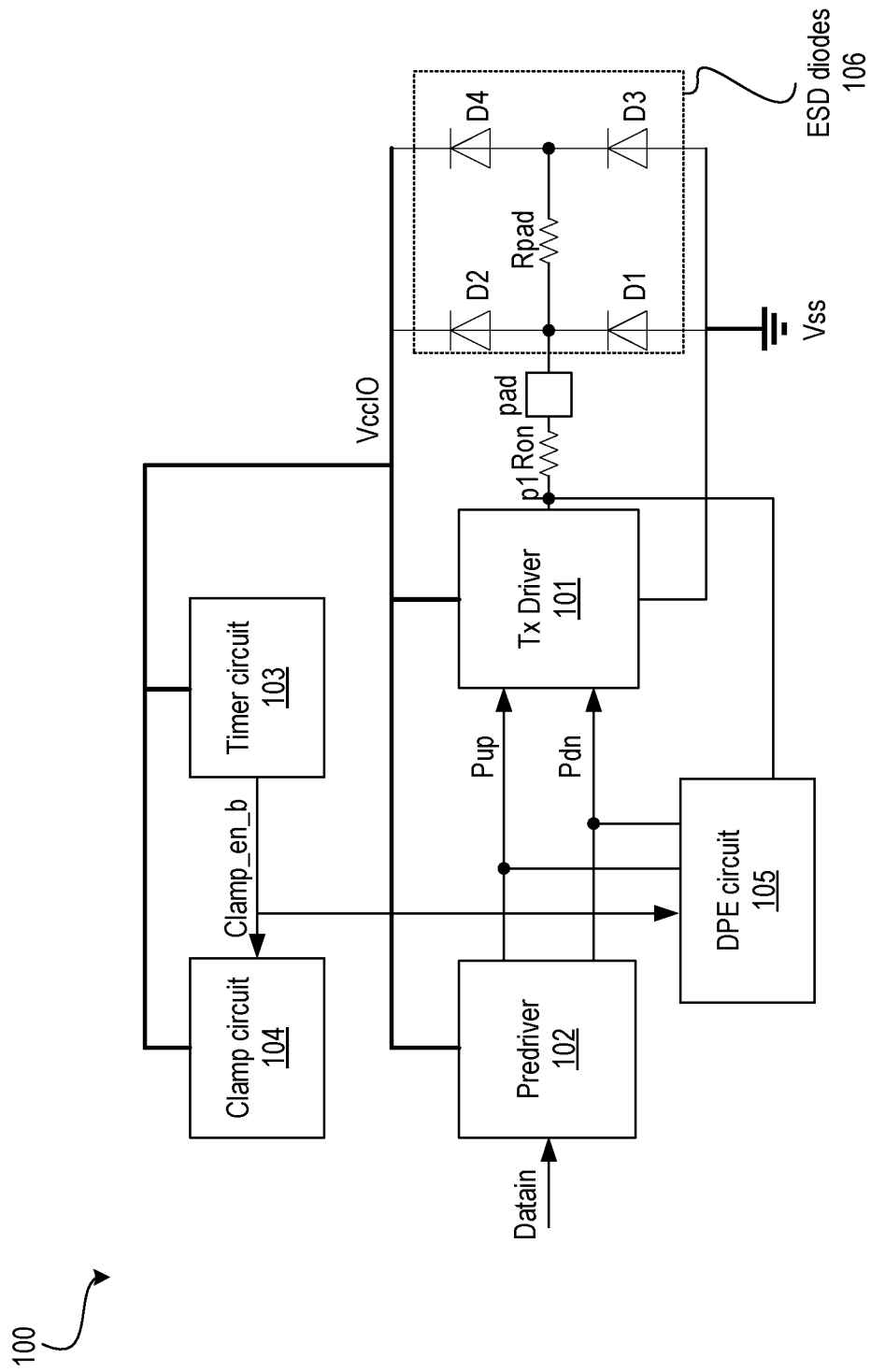
FIG. 1 illustrates a high-level architecture of driver assisted ESD apparatus, in accordance with some embodiments.

Some embodiments use an Analog Front End (AFE) driver or transmitter for ESD protection of an input-output (IO) pin, thus reducing ESD diode count and subsequently lowering the pad capacitance to achieve high performance in IO circuits like double data rate (DDR) IO, PCI Express (Peripheral Component Interconnect Express), etc. Some embodiments utilize the channel of active devices that constitute the AFE driver connected to an IO pad to discharge the ESD current to ground, thus providing an alternative path to ESD current and subsequently reducing the ESD diode count. Some embodiments provide an additional p-type device (Driver Path Enabler (DPE)) coupled between the IO pad and a gate terminal of the AFE driver. This addition p-type device triggers the channel of the AFE driver. This p-type device is controlled by an RC based structure which cuts the p-type device off during regular operations when power is ramped-up.

In some embodiments, the driver assisted ESD protection apparatus comprises: an IO pad; a driver coupled to the IO pad, wherein the driver comprises a p-type device and an n-type device coupled in series with the p-type device; and a circuit (DPE circuit) to turn on one of the p-type device or the n-type device of the driver when an ESD event occurs on the IO pad. In some embodiments, the circuit turns off one of the p-type device or the n-type device when the ESD event completes. In some embodiments, the circuit turns offs both of the p-type device or the n-type device when the ESD event completes. In some embodiments, the apparatus comprises a timer circuit (e.g., an RC timer) to determine a duration of time the circuit is to turn on one of the p-type device or n-type device when the ESD event occurs on the IO pad. In some embodiments, the DPE circuit comprises a first p-type device and a second p-type device, wherein the first p-type device is coupled to the p-type device of the driver, wherein the second p-type device is coupled to the n-type device of the driver. In some embodiments, gate terminals of the first p-type device and the second p-type device are coupled to an output of the timer circuit. In some embodiments, drain terminals of first p-type device and the second p-type device are coupled. In some embodiments, a source terminal of the first p-type device is coupled to a gate of the p-type device of the driver. In some embodiments, a source terminal of the second p-type device is coupled to a gate of the n-type device of the driver. In some embodiments, the apparatus comprises a clamp circuit coupled to an output of the timer circuit for protecting the power supply bumps from ESD event. In some embodiments, the apparatus comprises a predriver coupled to the circuit and the driver.

There are many technical effects of various embodiments. For example, the embodiments lower capacitance of the IO pad thus enabling IOs to run at higher speed or higher timing margin without burning more power. As such, diode and I/O area are saved. The embodiments are compatible with advanced technology process nodes that use Gate-all-around field effect transistors (FETs) where parasitic diode benefits may be lost thus causing the high-speed IP's to use inductors which add cost to the products. The embodiments of various embodiments enable zero-ESD-Diode in Die-to-Die IOs like high-bandwidth memory IO (HBMIO). Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" here generally refers to any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a high-level architecture of driver assisted ESD apparatus 100, in accordance with some embodiments. Apparatus 100 comprises transmitter (Tx) driver 101 (or analog-front-end (AFE) driver 101), predriver 102, timer circuit 103, clamp circuit 104, driver path enabler (DPE) circuit 105, and ESD diodes 106 (e.g., diodes D1, D2, D3, and D4) coupled as shown. AFE driver 101 comprises a pull-up device coupled in series with a pull-down device. The pull-up device is coupled to a power supply rail VccIO while the pull-down device is coupled to a ground supply rail (Vss). Timer circuit 103 is responsible for turning on and off clamp circuit 104. During an ESD event on the pad, clamp circuit 104 provides a path from VccIO power supply rail to ground. Clamp circuit 104 is turned on for the time duration of the ESD event. This time duration is determined by timer circuit 103. Predriver 102 provides the pull-up (Pup) and pull-down (Pdn) control signals for driver 101. The pull-up (Pup) and pull-down (Pdn) control signals are derived from input data Datain.

During a negative charge device model (CDM) ESD event, the pad voltage rises. The node connecting the devices of AFE driver 101 also rise but at a lower value because of drop across ballast resistance. This voltage is used by DPE circuit 105 to bias the gates of the devices of AFE driver 101 during the ESD event to turn-on the channels of one or more device of AFE driver 101 and use the AFE driver path to push the ESD current to ground (Vss).

DPE circuit 105 does not impact the regular function of AFE driver 101. In some embodiments, devices of DPE circuit 105 are controlled by the output (clamp_en_b) of timer circuit 103. The gates of devices of DPE circuit 105 are driven by the output clamp_en_b. When AFE driver 101 is activated as the result of pad voltage raising during an ESD event, the voltage at AFE driver's drain comes down drastically, as the devices of AFE driver 101 provide an electrical path between the IO pad and ground, thus reducing the ESD current through the main diodes D2 and D4. As such, apparatus 100 is more helpful when the designs are limited by victim (driver) breakdown voltages which have less or minimum parasitic diodes benefit. DPE circuit 105 masks the controls (Pup and Pdn) during an ESD event and provides an additional path for the surge voltage on the pad to flow to ground. As such, DPE circuit 105 reuses the device of driver(s) 101 for ESD purposes, which otherwise operate as normal driver devices during non-ESD modes (e.g., normal modes). This alternate use of the devices of driver 101 can be used to reduce the number and/or size of ESD diodes 106 (diodes D1-D4). In some examples, ESD diodes 106 can be completely removed because devices of driver 101 can be controlled to provide ESD protection during an ESD event.

While the embodiments are described with reference to a negative CDM, the embodiments are also applicable for a positive CDM where current from the IO pad is pulled out. During positive CDM the DPE circuit 105 turn on the pull-up PMOS of the AFE driver 101 providing additional path from pad to VccIO to ground via clamp circuit 104. The impact of DPE circuit 105 is smaller in positive CDM compared to negative CDM in some embodiments because of the higher resistive path through the clamp 104 path compared to D1 106.

Figure 2:
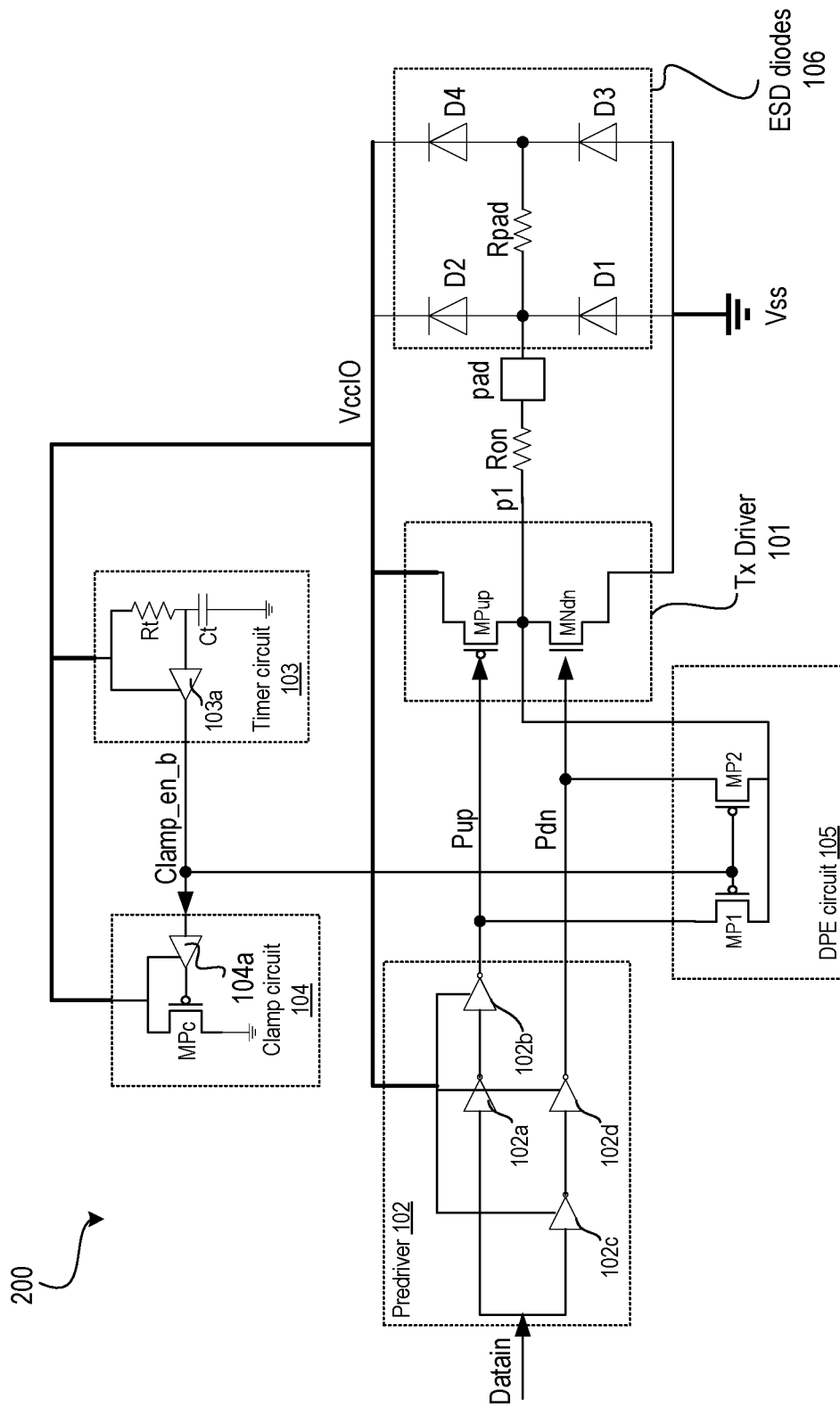
FIG. 2 illustrates a circuit level architecture of driver assisted ESD apparatus, in accordance with some embodiments.

FIG. 2 illustrates a circuit level architecture of driver assisted ESD apparatus 200, in accordance with some embodiments. Here, a simplified circuit for driver 101 is illustrated comprises p-type device MPup and n-type device MNdn coupled in series. In some embodiments, additional devices (active or passive) can exist between p-type device MPup and n-type device MNdn. P-type device MPup is the pull-up driver controlled by Pup. N-type device MNdn is the pull-down driver controlled by Pdn. Predriver 102 comprises inverters 102a, 102b, 102c, and 102d coupled as shown to derive Pup and Pdn signals from Datain. Here, predriver 102 is illustrated as a simple circuit. A person skilled in the art would appreciate that any suitable predriver may be used to implement predriver 102. Timer circuit 103 comprises an RC path (including resistor Rt and capacitor Ct) coupled to a buffer 103a. The output Clamp_en_b of buffer 103a controls the turn on/off duration of clamp circuit 104. A simple form of clamp circuit 104 comprises a buffer 104a and p-type clamp MPc. Any suitable clamp circuit may be used for clamp circuit 104.

In some embodiments, DPE circuit 105 comprises p-type devices MP1 and MP2. The source/drain terminals of transistors MP1 and MP2 are coupled to the Pad (via any intermediate resistance such as a Ron and Rpad). The drain/source terminals of transistors MP1 and MP2 are coupled to Pup and Pdn nodes, respectively. Here, node names and signal names are interchangeably used. For example, Pdn may refer to node Pdn or signal Pdn depending on the context of the sentence. The gates of transistors MP1 and MP2 are controllable by Clamp_en_b (e.g., output of timer circuit 103).

The devices MPup and MNdn of AFE driver 101 provide additional ESD current discharge path to supply VccIO or ground Vss during positive and negative CDM events respectively. To do that, the already existing timer circuit 103 is used. Timer circuit 103 usually exists for ESD protection circuits to control clamp circuit 104 used to provide path from VccIO to ground for negative CDM ESD currents. The output Clamp_en_b of timer circuit 103 is at zero by default when there is no power on VccIO. The output Clamp_en_b goes to VccIO voltage level once the voltage on supply rail VccIO ramps up. Timer circuit 103 is used to control clamp circuit 104 which comprises a p-type based device MPc. As such, the p-type based clamp device MPc is by default ON and when supply ramps up, it turns OFF. Thus, the same timer signal (Clamp_en_b) is logically zero when there is no power, hence it keeps the devices MP1 and MP2 of DPE circuit 105 on.

During the ESD event, the devices MP1 and MP2 of DPE circuit 105 enable AFE, path's by taking Pdn and Pup voltages to around pad voltages turning Tx driver 101 on, to discharge ESD currents to ground. And when power ramps up, Clamp_en_b goes to VccIO voltage level, thus turning off the devices MP1 and MP2 of DPE circuit 105 thus removing any impact to regular functionality of driver 101. Here, the ESD events being protected are the non-system ESD events which occur when there is no power supply. A person skilled in the art would appreciate that driver devices MPup and MNdn inherently have parasitic diodes. Clamp_en_b signal turns on the devices MP1 and MP2 of DPE circuit 105. These devices MP1 and MP2 are connected to pad thus enabling the AFE driver's control signals (Pup and Pdn) to provide the path to ground or supply during an ESD event. Under normal operational conditions clamp_en_b is high thus disabling the DPE devices MP1 and MP2. In various embodiments, the size of DPE circuit 105 is about ten times smaller than the size of driver 101. For example, transistor MP1 is 10 times smaller than MPup thus not stressing the system in terms of area and Pad-capacitance.

While the embodiments are described with reference to p-type devices of DPE circuit 105, in some embodiments, the p-type devices can be replaced with n-type devices. The gate terminals of the n-type devices are controllable by an inverted version of clamp_en_b signal (e.g., clamp_en). In some embodiments, p-type devices of DPE circuit 105 can be replaced by a combination of n-type and p-type devices.

Figure 3:
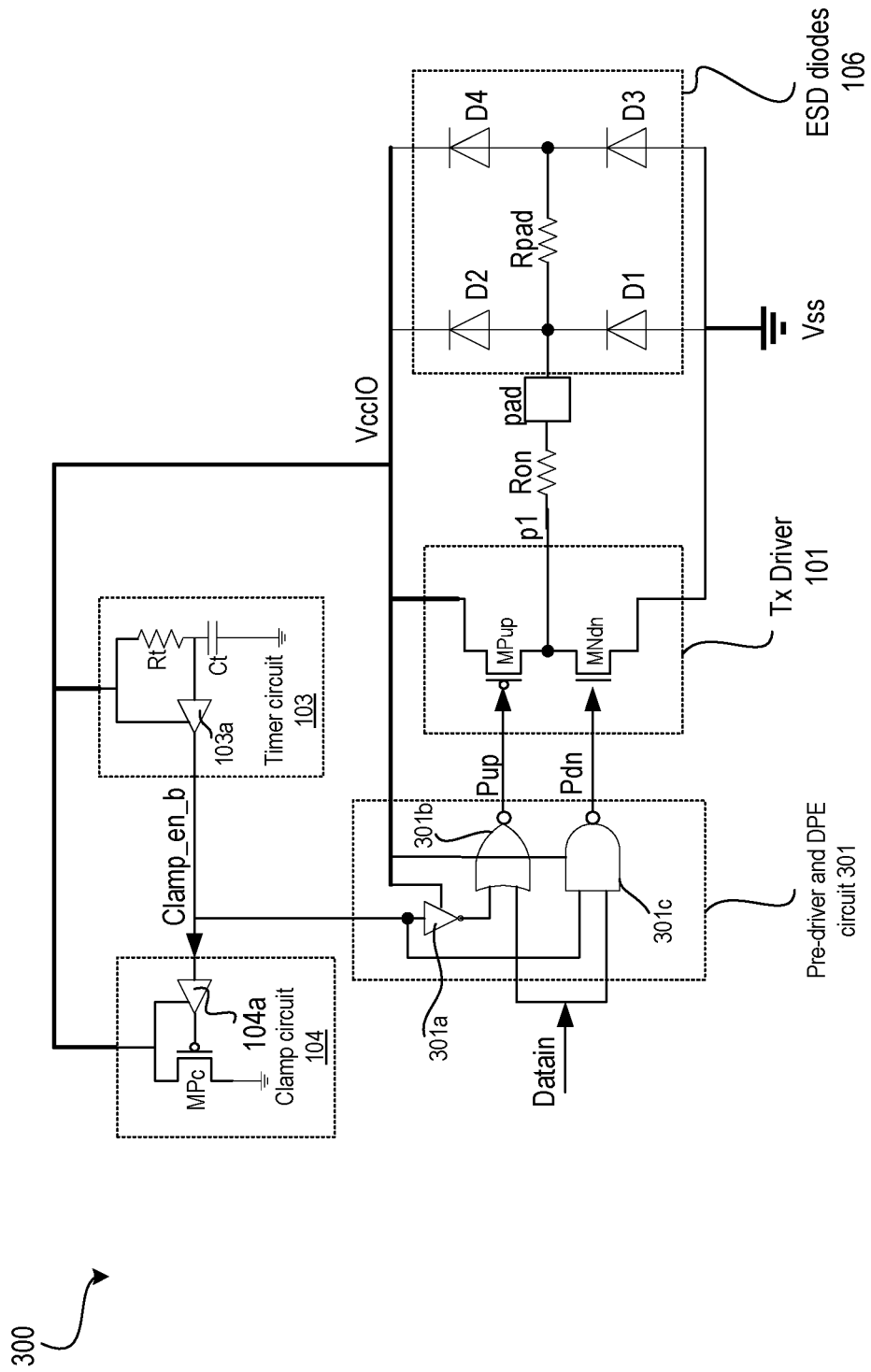
FIG. 3 illustrates a circuit level architecture of driver assisted ESD apparatus, in accordance with some embodiments.

FIG. 3 illustrates a circuit level architecture of driver assisted ESD apparatus 300, in accordance with some embodiments. Apparatus 300 is an alternative embodiments. Here, the predriver 102 and DPE circuit 105 are merged as circuit 301. Circuit 301 comprises inverter 301a, NOR gate 301b, and NAND gate 301c. Input data Datain is received by NOR gate 301b and NAND gate 301c. Both NOR gate 301b and NAND gate 301c are also controlled by Clamp_en_b. For example, NAND gate 301c receives Clamp_en_b signal while NOR gate 301b receives an inverted Clamp_en_b signal via inverter 301a. The output of NOR gate 301b controls the Pup node while the output of NAND gate 301c controls the Pdn gate.

Table 1 compares ESD data for DDR and PCIe designs.

TABLE 1

| ESD factors | No. of D1 diodes | No. of D2 diodes |
|---|---|---|
| Reference Design (DDR)* | X | Y |
| Driver Assisted ESD (DDR) | X | 0.5Y |
| Reference Design (PCIE) | A | B |
| Driver Assisted ESD (PCIE) | A | 0.8B |

Table 2 illustrates the improvement in pad capacitance when the apparatus of various embodiment sis used.

TABLE 2

| Pad Cap Improvement | DDRIO (ESD Only) | PCIE (ESD Only) |
|---|---|---|
| Percentage Cap reduction | 23% | 8.7% |

During an ESD event, C4 pad can tolerate a high voltage (e.g., several 10s of volts) utilizing the benefit of the parasitic diodes (diodes formed between diffusion and bulk of devices connected to the IO pad). The relative number of diodes to meet the ESD event are listed in table 1. In a device limited design like DDR, majority of the ESD current flows through the main diodes causing a higher number of diodes count. Such designs are limited by the device breakdown voltage and not by diode breakdown voltage. On the other hand, designs with huge driver sizes like PCIE are diode limited designs. They are limited by diode breakdown voltages and not device breakdown voltage. Here parasitic current carries a good percentage of total current. Next paragraph we discuss how driver assisted (A) schemes effect both the designs.

Since the DDR design is device limited, when driver 101 is turned on during an ESD event (both p-type and/or n-type-DA assisted schemes), there is a sharp rise in current through driver 101, thus lowering the device voltage way below the breakdown limit. This enables cutting down in the number of the active diodes by approximately 50% as shown in Table 1. Meanwhile when DA assisted scheme is applied to a diode limited design like PCIE there is less reduction in diode current thus reducing diode counts by approximately 20% as shown in Table 1.

By cutting down the number of D2 diodes count by approximately 50% in DDR, pad capacitance is reduced thus achieving better eye height and eye width. The amount of benefit in PCIE is lower than DDR since PCIE design is already diode limited. Using the design technique of various embodiments, a reduction of about 20% in number of D2 diode is realized.

In some embodiments, the scheme can be used to get rid of the diodes completely for IO which are not exposed to package pins like HBMIO. This also helps in scaling of these IOs, diodes and their guard rings. Today these are prime limiters for the area scaling of these IOs.

Figure 4:
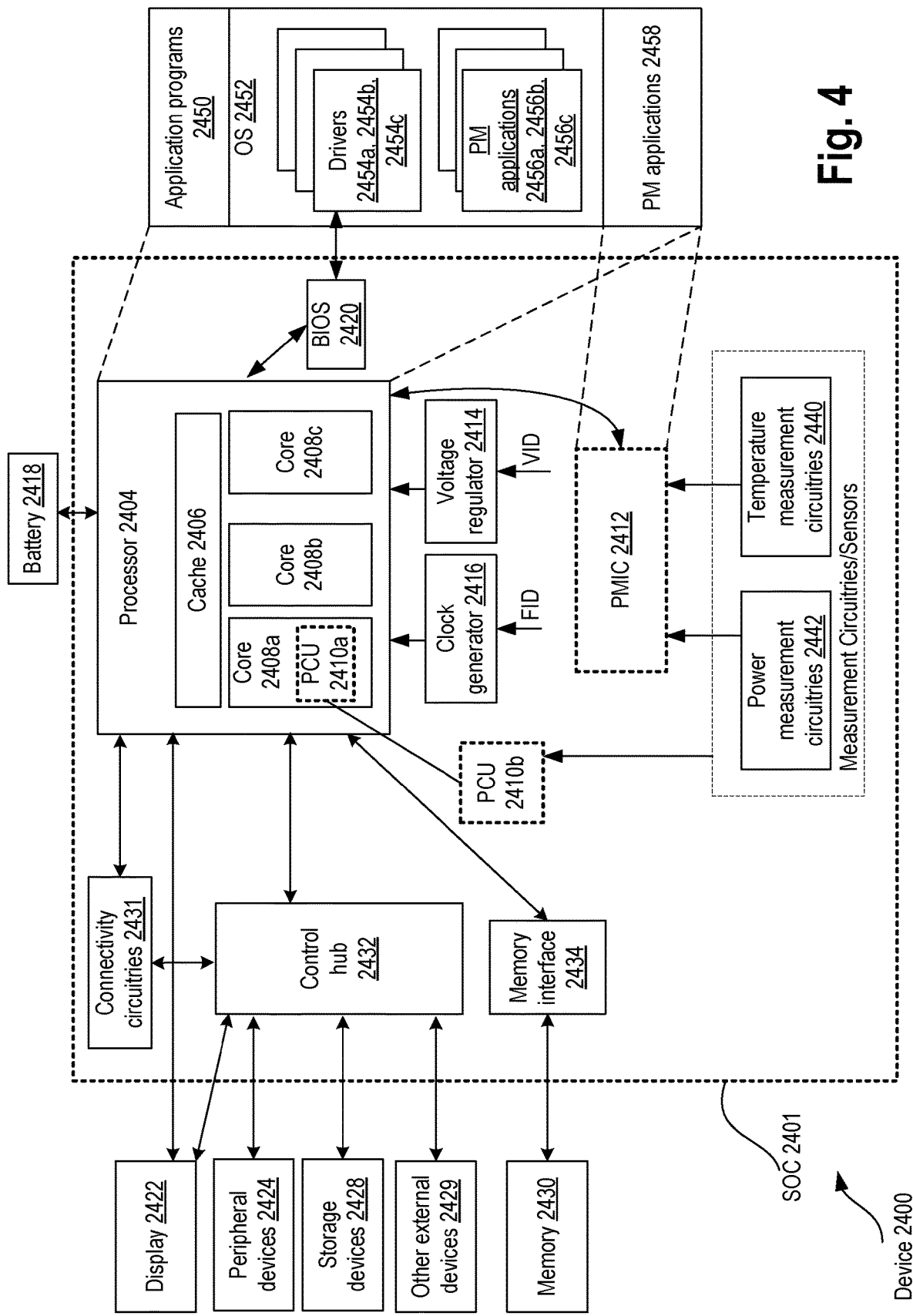
FIG. 4 illustrates a smart device or a computer system or a SoC (System-on-Chip) having driver assisted ESD apparatus, in accordance with various embodiments.

FIG. 4 illustrates a smart device or a computer system or a SoC (System-on-Chip) having driver assisted ESD apparatus, in accordance with various embodiments. It is pointed out that those elements of FIG. 4 having the same reference numbers (or names) as the elements of any other figure can operate or function in any manner similar to that described, but are not limited to such. Any of the blocks described here can have the current tracking apparatus. Any of the IOs within device 2400 and/or along its periphery may include driver assisted ESD apparatus.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 4, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408*a*, 2408*b*, 2408*c*. Although merely three cores 2408*a*, 2408*b*, 2408*c* are illustrated in FIG. 4, processor 2404 may include any other appropriate number of processing cores, e.g., tens, or even hundreds of processing cores. Processor cores 2408*a*, 2408*b*, 2408*c* may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408*a*, a second section of cache 2406 dedicated to core 2408*b*, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System (OS) 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1

An apparatus comprising: an IO pad; a driver coupled to the IO pad, wherein the driver comprises a p-type device and an n-type device coupled in series with the p-type device; and a circuit to turn on one of the p-type device or the n-type device of the driver when an ESD event occurs on the IO pad.

Example 2

The apparatus of example 1, wherein the circuit is to turn off one of the p-type device or the n-type device when the ESD event completes.

Example 3

The apparatus of example 1 comprises a timer circuit to determine a duration of time the circuit is to turn on one of the p-type device or n-type device when the ESD event occurs on the IO pad.

Example 4

The apparatus of example 3, wherein the circuit comprises a first p-type device and a second p-type device, wherein the first p-type device is coupled to the p-type device of the driver, wherein the second p-type device is coupled to the n-type device of the driver.

Example 5

The apparatus of example 4, wherein gate terminals of the first p-type device and the second p-type device are coupled to an output of the timer circuit.

Example 6

The apparatus of example 4, wherein drain terminals of the first p-type device and the second p-type device are coupled and further coupled to the IO pad.

Example 7

The apparatus of example 4, wherein a source terminal of the first p-type device is coupled to a gate of the p-type device of the driver.

Example 8

The apparatus of example 4, wherein a source terminal of the second p-type device is coupled to a gate of the n-type device of the driver.

Example 9

The apparatus of example 3 comprises a clamp circuit coupled to an output of the timer circuit.

Example 10

The apparatus of example 1 comprises a predriver coupled to the circuit and the driver.

Example 11

An apparatus comprising: an IO pad; a driver coupled to the IO pad, wherein the driver comprises a p-type device and an n-type device coupled in series with the p-type device; and a circuit comprising: a first p-type device coupled to the p-type device of the driver; and a second p-type device coupled to the n-type device of the driver, wherein gate terminals of the first and second p-type devices are controllable by an ESD event.

Example 12

The apparatus of example 11, wherein the circuit is to turn on one of the p-type device or the n-type device when the ESD event occurs on the IO pad.

Example 13

The apparatus of example 11, wherein the circuit is to turn off one of the p-type device or n-type device when the ESD event completes.

Example 14

The apparatus of example 11, wherein gate terminals of the first p-type device and the second p-type device are coupled to an output of a timer circuit.

Example 15

The apparatus of example 11, wherein drain terminals of the first p-type device and the second p-type device are coupled and further coupled to the IO pad.

Example 16

The apparatus of example 11, wherein a source terminal of the first p-type device is coupled to a gate of the p-type device of the driver.

Example 17

The apparatus of example 11, wherein a source terminal of the second p-type device is coupled to a gate of the n-type device of the driver.

Example 18

A system comprising: a memory; a processor coupled to the memory; and a wireless interface communicatively coupled to the processor, wherein the processor includes: an IO pad; a driver coupled to the IO pad, wherein the driver comprises a p-type device and an n-type device coupled in series with the p-type device; and a circuit comprising: a first p-type device coupled to the p-type device of the driver; and a second p-type device coupled to the n-type device of the driver, wherein gate terminals of the first and second p-type devices are controllable by an ESD event.

Example 19

The system of example 18, wherein the circuit is to turn on one of the p-type device or the n-type device when the ESD event occurs on the IO pad, wherein the circuit is to turn off one of the p-type device or n-type device when the ESD event completes.

Example 20

The system of example 18, wherein gate terminals of the first p-type device and the second p-type device are coupled to an output of a timer circuit, and wherein drain terminals of first p-type device and the second p-type device are coupled.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a pad;
   a driver coupled to the pad, wherein the driver comprises a pull up device coupled in a series path with a pull down device, the pull up device is coupled to a power supply rail, the pull down device is coupled to ground and the pad is coupled to a point in the series path, the point is between the pull up device and the pull down device; and
   a circuit to couple the pad to a gate of the pull down device when a voltage rise occurs on the pad due to an Electro Static Discharge (ESD) event, wherein the voltage rise is to turn on the pull down device to ground the pad via the pull down device.

2. The apparatus of claim 1, wherein the circuit is to turn off the pull down device when the ESD event completes.

3. The apparatus of claim 1, further comprising a timer coupled to the pad via the power supply rail, wherein the timer is to output a signal indicating a duration of time the circuit is to turn on the pull down device when the ESD event occurs on the pad.

4. The apparatus of claim 3, wherein:
   the circuit comprises a first p-type device coupled in a path between the gate of the pull down device of the driver and the pad; and
   a gate of the first p-type device is coupled to the timer to receive the signal.

5. The apparatus of claim 3, further comprising a clamp circuit coupled to the timer and to the power supply rail, wherein the clamp circuit is to turn on in response to the signal during the ESD event, to provide a ground path for the pad via the power supply rail.

6. The apparatus of claim 1, wherein the circuit is to couple the pad to the gate of the pull down device via the point which is between the pull up device and the pull down device.

7. The apparatus of claim 1, wherein the pull down device is an n-type device.

8. The apparatus of claim 1, wherein the ESD event occurs when there is no power supply to the power supply rail.

9. The apparatus of claim 1, wherein:
   the circuit is to couple the pad to a gate of the pull up device during the ESD event; and
   the pull up device is a p-type device.

10. The apparatus of claim 1, wherein the circuit comprises a p-type device to couple the pad to the gate of the pull down device.

11. The apparatus of claim 1, wherein:
    the pull down device and the pull up device operate as device drivers during a normal, non-ESD mode of the driver.

12. The apparatus of claim 4, wherein:
    the first p-type device is to turn off in response to the timer when the ESD event completes.

13. An apparatus, comprising:
    a pad;
    a driver coupled to the pad, wherein the driver comprises a pull up device coupled in a series path with a pull down device, the pull up device is coupled to a power supply rail, the pull down device is coupled to ground and the pad is coupled to a point in the series path, the point is between the pull up device and the pull down device; and
    a circuit to couple the pad to a gate of the pull up device when a voltage drop occurs on the pad due to an Electro Static Discharge (ESD) event, wherein the voltage drop is to turn on the pull up device to provide a ground path for the pad, the ground path comprises the pull up device and the power supply rail.

14. The apparatus of claim 13, further comprising a clamp circuit coupled to the power supply rail, wherein the ground path comprises the clamp circuit.

15. The apparatus of claim 13, wherein the pull up device comprises a p-type device.

16. The apparatus of claim 13, further comprising a timer coupled to the pad via the power supply rail, wherein the timer is to output a signal indicating a duration of time the circuit is to turn on the pull up device when the ESD event occurs.

17. The apparatus of claim 16, wherein:
    the circuit comprises a first p-type device coupled in a path between the gate of the pull up device of the driver and the pad; and
    a gate of the first p-type device is coupled to the timer to receive the signal.

* * * * *